United States Patent
Park et al.

(10) Patent No.: US 8,340,725 B2
(45) Date of Patent: Dec. 25, 2012

(54) MOBILE TERMINAL AND TOUCH RECOGNITION METHOD THEREFOR

(75) Inventors: Sun-Myung Park, Seoul (KR); Cha-Bong Choi, Seoul (KR); Jin-Hwan Chea, Seoul (KR)

(73) Assignee: LG Electronics Inc., Seoul (KR)

( * ) Notice: Subject to any disclaimer, the term of this patent is extended or adjusted under 35 U.S.C. 154(b) by 783 days.

(21) Appl. No.: 12/029,888

(22) Filed: Feb. 12, 2008

(65) Prior Publication Data

US 2009/0061947 A1 Mar. 5, 2009

(30) Foreign Application Priority Data

Sep. 3, 2007 (KR) .......................... 10-2007-0089178

(51) Int. Cl.
*H04M 1/00* (2006.01)
(52) U.S. Cl. .................. 455/566; 455/556.1; 455/563
(58) Field of Classification Search .................. 455/566
See application file for complete search history.

(56) References Cited

U.S. PATENT DOCUMENTS

| | | | |
|---|---|---|---|
| 7,145,593 B2 * | 12/2006 | Yamaguchi et al. | 348/14.02 |
| 7,692,667 B2 * | 4/2010 | Nguyen et al. | 345/619 |
| 7,761,806 B2 * | 7/2010 | Kim | 715/784 |
| 2003/0038786 A1 | 2/2003 | Nguyen et al. | |
| 2004/0248621 A1 | 12/2004 | Schon | |
| 2006/0077182 A1 | 4/2006 | Studt | |
| 2006/0128361 A1 * | 6/2006 | Kim | 455/411 |
| 2006/0153120 A1 * | 7/2006 | Channasamudhram | 370/328 |
| 2006/0187212 A1 * | 8/2006 | Park et al. | 345/169 |
| 2007/0252853 A1 * | 11/2007 | Park et al. | 345/649 |
| 2011/0173664 A1 * | 7/2011 | Knudson | 725/46 |

FOREIGN PATENT DOCUMENTS

| | | |
|---|---|---|
| EP | 1 107 101 A2 | 6/2001 |
| EP | 1 758 345 A1 | 2/2007 |
| EP | 1 780 992 A2 | 5/2007 |
| GB | 2 380 583 A | 4/2003 |

* cited by examiner

*Primary Examiner* — Duc Nguyen
*Assistant Examiner* — Ajibola Akinyemi
(74) *Attorney, Agent, or Firm* — Birch, Stewart, Kolasch & Birch, LLP

(57) ABSTRACT

Disclosed is a touch recognition method for preventing an execution of a function associated with an icon by unintentionally touching the icon when a slide-type mobile terminal performs a sliding motion and a mobile terminal implementing such method. If a pre-command is inputted by a touch through the touch screen of the mobile terminal, a pre-command operation that is predetermined is performed. If a sliding motion is detected while the pre-command is performed, the pre-command operation is cancelled.

16 Claims, 10 Drawing Sheets

1
MOBILE TERMINAL AND TOUCH RECOGNITION METHOD THEREFOR

CROSS REFERENCE TO RELATED APPLICATIONS

This application is related to, and claims priority to, Korean patent application 10-2007-0089178 filed on Sep. 3, 2007, the entire contents of which are incorporated by reference herein.

BACKGROUND OF THE INVENTION

1. Field of the Invention

The present invention relates to a touch recognition method for preventing an execution of a function associated with an icon by unintentionally touching the icon when a slide-type mobile terminal performs a sliding motion, and to a mobile terminal implementing such method.

2. Description of the Background Art

In general, a mobile terminal is a portable device which is equipped with one or more functions of a voice/video communication function, an information input/output function, a data storage function, and the like.

As functions thereof are diversified, the mobile terminal has various complicated functions, such as taking a picture or a video, playing a music file or a video file, playing a game, receiving broadcasts, and the like. Also, the mobile terminal has been implemented as an integrated multimedia player.

Various attempts have been made to such multimedia player to implement complicated functions in a hardware implementation or a software implementation. For instance, a user interface environment is provided for a user to easily and conveniently search or select functions.

Further, the mobile terminal is considered as personal belongings to express a user's personality, thereby requiring various designs. For instance, such designs including a folder-type, a slide-type, a bar-type or a rotation-type, have been adapted to the mobile terminal. Further, a mobile terminal in which a size of a manipulating portion disposed at a first body of a slide-type mobile terminal is minimized, but instead, a size of a display portion to which a touch sensitive function is added is increased, has been recently introduced.

However, as the size of the display portion having the touch sensitive function is increased, general users are likely to press the display portion unintentionally when sliding the mobile phone. If a certain functional icon is present at a pressed portion on the display unit, the icon is touched, thereby automatically executing a function associated with the icon which the user does not intend to.

SUMMARY OF THE INVENTION

Therefore, it is an object of the present invention to provide a method for preventing an operation that is not intended by a user by detecting a sliding motion when a slide-type mobile terminal having a touch screen on a front surface has a touch input, and by cancelling the touch input if the touch input is performed when the mobile terminal performs the sliding notion, and a mobile terminal implementing such method.

Another object of the present invention is to provide a method for preventing an operation of a terminal by a touch that is not intended by a user by ignoring a signal inputted by a touch when a slide-type mobile terminal having a touch screen on a front surface performs a sliding motion, and a mobile terminal implementing such method.

To achieve these and other advantages and in accordance with the purpose of the present invention, as embodied and broadly described herein, there is provided a mobile terminal, including: a sensing portion for detecting an open configuration and a closed configuration by a sliding motion of a first body and a second body; a touch screen disposed at least one of the first body or the second body for performing a touch input and a display function; and a controlling portion disposed at one of the first body or the second body for processing the touch input according to the sliding motion.

If a pre-command is inputted by a touch through a touch screen of a mobile terminal, a pre-command operation that is predetermined is performed. And, if a sliding motion is detected while the pre-command operation is performed, the pre-command operation is cancelled.

The present invention can prevent an unintended operation by ignoring a signal inputted by a touch when a slide-type mobile terminal having a touch screen on a front surface performs a sliding motion.

The present invention can prevent an execution of a predetermined function by an unintended touch input when a slide-type mobile terminal having a touch screen on a front surface performs a sliding motion.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
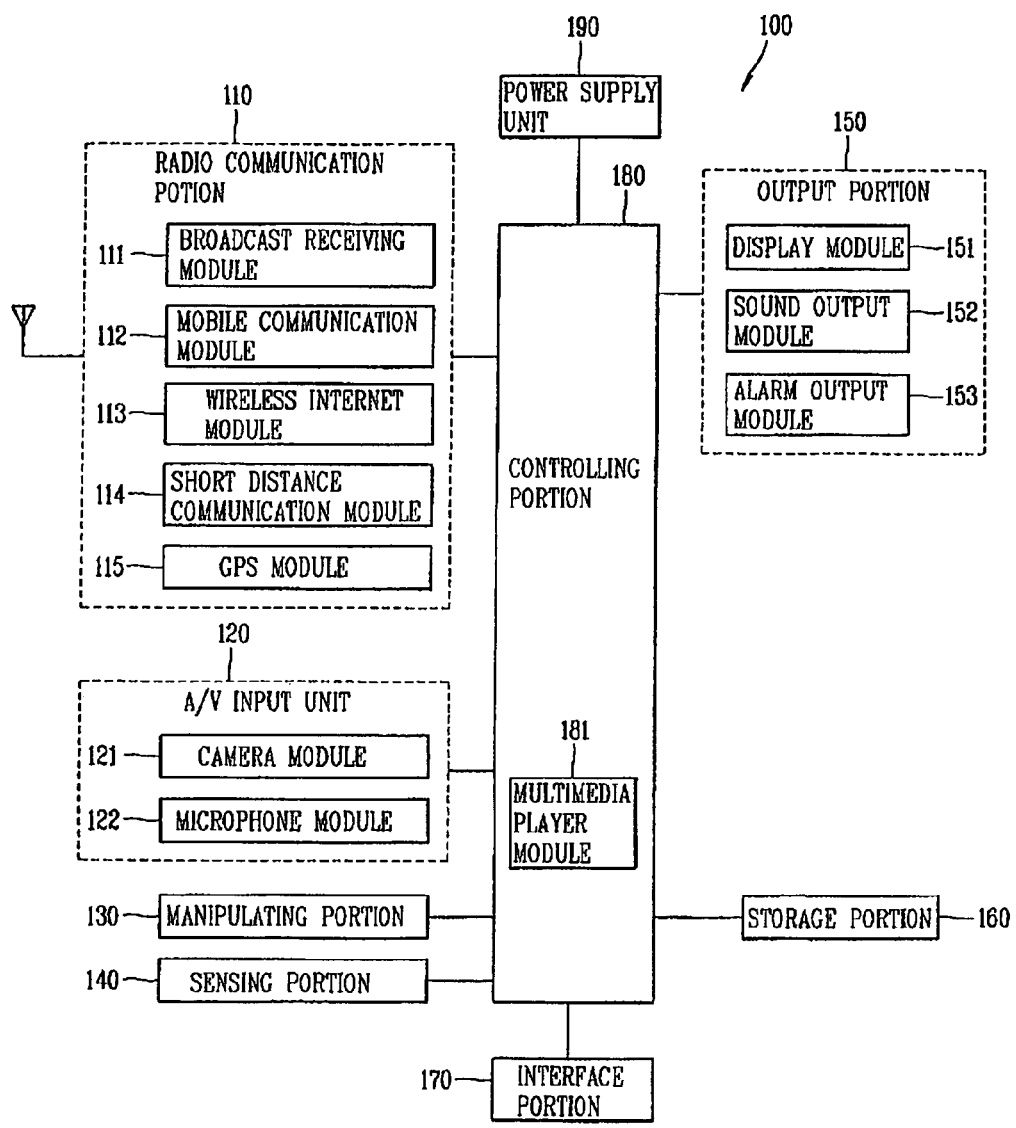
FIG. 1 is a block diagram showing functional elements of a mobile terminal according to one embodiment of the present invention.

Description will now be given in detail of preferred embodiments of the present invention, examples of which are illustrated in the accompanying drawings. However, detailed explanations for a related art, which are determined to make the gist of the present invention ambiguous, and configurations thereof are omitted. The same reference numerals for relevant components having the same function in each embodiment will be used throughout the drawings to refer to the same or like parts.

A mobile terminal in the present invention may refer to a mobile phone, a smart phone, a notebook computer, a digital multimedia broadcasting terminal, a navigation, a PDA (Personal Digital Assistant), a PMP (Portable Multimedia Player), and the like.

FIG. 1 is a block diagram showing functional elements of a mobile terminal according to one embodiment of the present invention.

As shown in drawing, a mobile terminal 100 of the present invention may include a radio communication portion 110, an A/V (Audio/Video) input portion 120, a manipulating portion 130, a sensing portion 140, an output portion 150, a storage portion 160, an interface portion 170, a controlling portion 180, a power supply portion 190, and the like. It should be noted that when such functional elements are embodied in application, two or more elements may be integrated into one element, or one element may be subdivided into two or more elements when necessary.

Hereinafter, explanations for the functional elements are given in detail.

First, the radio communication portion 110 may include a broadcast receiving module 111, a mobile communication module 112, a wireless internet module 113, a short distance communication module 114, a GPS (Global Positioning System) module 115, and the like.

The broadcast receiving module 111 receives a broadcast signal and/or broadcast-related information from an external broadcast managing server through a broadcast channel. The broadcast channel may include a satellite channel or a ground wave channel. The broadcast managing server may refer to a server which generates and transmits a broadcast signal and/or broadcast-related information, or a server which receives a broadcast signal and/or broadcast-related information that are already generated and then transmits the received signal/information to a terminal.

The broadcast-related information may refer to information regarding a broadcast channel, a broadcast program, or a broadcast service provider. The broadcast signal may include a broadcast signal that a data broadcast signal is associated with a TV broadcast signal or a radio broadcast signal, as well as the TV broadcast signal, the radio broadcast signal and the data broadcast signal.

In addition, the broadcast-related information may be provided via a mobile communication network. Here, the broadcast-related information can be received by the mobile communication module 112.

Further, the broadcast-related information may be implemented in various forms, for instance, an EPG (Electronic Program Guide) of a DMB (Digital Multimedia Broadcasting), or an ESG (Electronic Service Guide) of a DVB-H (Digital Video Broadcast-Handheld), or the like.

Also, the broadcast receiving module 111 receives a broadcast signal by using various broadcast systems. In particular, the digital broadcast signal can be received by using a digital broadcast system, such as a DMB-T (Digital Multimedia Broadcasting-Terrestrial), DMB-S (Digital Multimedia Broadcasting-Satellite), MediaFLO (Media Forward Link Only), DVB-H (Digital Video Broadcast-Handheld), and ISDB-T (Integrated Services Digital Broadcast-Terrestrial). The broadcast receiving module 111 is adaptively configured to all broadcast systems for providing a broadcast signal as well as the above-mentioned digital broadcast systems.

The storage portion 160 stores the broadcast signal and/or broadcast-related information received through the broadcast receiving module 111.

In addition, the mobile communication module 112 sends and receives a radio signal from at least one of a base station, an external terminal and a server on a mobile communication network. H-ere, the radio signal may include various forms of data when sending and receiving a call signal for voice communication, a call signal for video communication or a text/multimedia message.

Meanwhile, the wireless internet module 113 is a module for the wireless internet connection, and can be built in the terminal or be externally disposed at the terminal.

Further, the short distance communication module 114 is a module for the short distance communication. The short distance communication technology may include a Bluetooth, an RFD (Radio Frequency Identification), an IrDA (infrared Data Association), a UWB (Ultra Wideband), a ZigBee, and the like. Also, the GPS module 115 receives location information from a plurality of satellites.

Meanwhile, the A/V input portion 120 is to input an audio signal or a video signal, and may include a camera module 121 and a microphone module 122. The camera module 121 processes a picture frame such as a still image or a moving image, etc. taken by an image sensor in the video communication mode or an image-capturing mode. And, the processed video frame can be displayed on a display module 151.

The picture frame processed by the camera module 121 may be stored in the storage portion 160 or be transmitted to the outside through the radio communication portion 110. In addition, two or more camera modules 121 may be provided according to the configuration of the terminal.

An external sound signal is inputted to the microphone module 122 in a calling mode or a recording mode, a voice recognition mode, and the like through a microphone, and is then processed into electric voice data. In the calling mode, the processed voice data is converted and outputted into a form capable of transmitting to the mobile communication base station through the mobile communication module 112. The microphone module 122 may be implemented with various noise removal algorithms for removing the noise generating during a process to which the external sound signal is inputted.

The manipulating portion 130 generates a key input data which is a user's input for controlling the terminal's operation. The manipulating portion 130 may be configured to have a key pad, a dome switch, a touch pad (e.g., static pressure/capacitance), a jog wheel, a jog switch, and the like. In particular, if the touch pad and a display module 151, as described later, have a layered structure therebetween, the structure can be called as a touch screen.

Detailed descriptions of a method for executing a function by touching the touch screen in the present invention will be given in detail in reference to other drawings, in connection with a method for sensing whether a slide-type phone is opened or closed.

The sensing portion 140 senses a current status of the mobile terminal 100 (e.g., whether the mobile terminal 100 is opened/closed, where the mobile terminal 100 is located, whether the user contacts the mobile terminal 100, etc.), and generates a sensing signal to control the operation of the mobile terminal 100. For instance, if the mobile terminal 100 is a slide-type phone, the sensing portion 100 can sense whether the slide-type mobile terminal is opened or closed. In addition, the sensing portion 140 performs sensing functions related to whether or not the power supply portion 190 has supplied the power, whether or not the interface portion 170 is connected to an external device, and the like.

Hereinafter, a structure for sensing whether or not the slide-type phone is open/closed and a method thereof will be described in detail with reference to another drawing.

The interface portion 170 serves as an interface with all external devices connected to the mobile terminal 100. Here, the external devices refer to, for instance, a wired/wireless headset, an external charger, a wired/wireless data port, a card socket (e.g., a memory card, SIM/UIM card), an audio input/output terminal, a video input/output terminal, an earphone, and the like. Data is transferred or a power is supplied to such interface portion 170 from the external device. Then, the interface portion 170 transfers the data or the power to each of the components inside the mobile terminal 100, or transmits data in the mobile terminal 100 to the external device.

The output portion 150 is to output an audio signal, a video signal or an alarm signal, and includes the display module 151, a sound output module 152, an alarm output module 153, and the like.

The display module 151 displays and outputs information processed by the mobile terminal 100. For instance, if the mobile terminal is in the calling mode, the display module 151 displays a calling-related UI (User Interface) or GUI (Graphical User Interface). And, if the mobile terminal 100 is in the video communication mode or the image-capturing mode, the display module 151 displays a captured or/and received video or an image-capturing related UI or GUI.

Meanwhile, as described above, if the touch screen is configured by the mutual layered structure of the display module 151 and the touch pad, the display module 151 may be used as an input device as well as the output device. The display module 151 may include at least one of a liquid crystal display, a thin film transistor-liquid crystal display, an organic light-emitting diode, a flexible display and a 3D display. Further, according to the implementation of the mobile terminal 100, two or more display modules 151 may be provided. For instance, the mobile terminal 100 may be provided with both an external display module (not shown) and an internal display module (not shown).

The sound output module 152 outputs audio data received from the radio communication portion 110 or stored in the storage portion 160 in the call signal receiving mode, the calling mode or the recording mode, the voice recognition mode, the broadcast receiving mode, and the like. And, the sound output module 152 outputs an audio signal related to a function performed by the mobile terminal 100 (e.g., a call signal receiving sound, a message receiving sound, etc.). Such sound output module 152 may include a speaker, a buzzer, and the like.

The alarm output module 153 outputs a signal to notify an event occurrence in the mobile terminal 100. Events occurring in the mobile terminal may include a call signal reception, a message reception, a key signal input, and the like. Also, the alarm output module 153 may output a signal to inform an event occurrence in another form (e.g., in vibration), other than the audio signal or the video signal. If a call signal or a message is received, the alarm output module 153 may vibrate to notify the reception of the call signal or the message.

If a key signal is inputted, the alarm output module 153 may vibrate for the feedback on the key signal input. Through such vibration, the user can recognize the event occurrence. The signal to notify the event occurrence can be outputted through the display module 151 or the sound output module 152.

The storage portion 160 can store a program for managing and controlling the controlling portion 180, and perform a function for temporarily storing data which is inputted/outputted (e.g., a phonebook, a message, a still image, a moving image, etc.)

The storage portion 160 may include at least one storage medium of a flash memory type, a hard disk type, a multimedia card micro type, a card-type memory such as an SD or XD memory, RAM and ROM. In addition, the mobile terminal 100 may provide a web storage service that performs the storage function of the storage portion 150 on the internet.

In general, the controlling portion 180 controls overall operations of the mobile terminal. The controlling portion 180 controls and processes a voice communication, a data communication, a video communication, and the like. In addition, the controlling portion 180 may have a multimedia player module 181 to play multimedia files. The multimedia player module 181 may be configured as hardware inside the controlling portion 180, or as software separately from the controlling portion 180.

Under the control of the controlling portion 180, the power from internal/external power sources is applied to the power supply portion 190, which supplies the power to each of the components.

As described so far, the functional elements of the mobile terminal according to the present invention have been explained. Hereinafter, external shapes of elements of the mobile terminal according to the present invention will be described in detail in reference to FIG. 2.

Hereinafter, for the convenience of explanation, the slide-type mobile terminal will be described as an example among various types of mobile terminals, such as a folder-type, a bar-type, a swing-type, a slide-type, and the like. Accordingly, the present invention is not limited to the slide-type mobile terminal, rather can be applied to all types of mobile terminals including the above-mentioned types.

Figure 2:
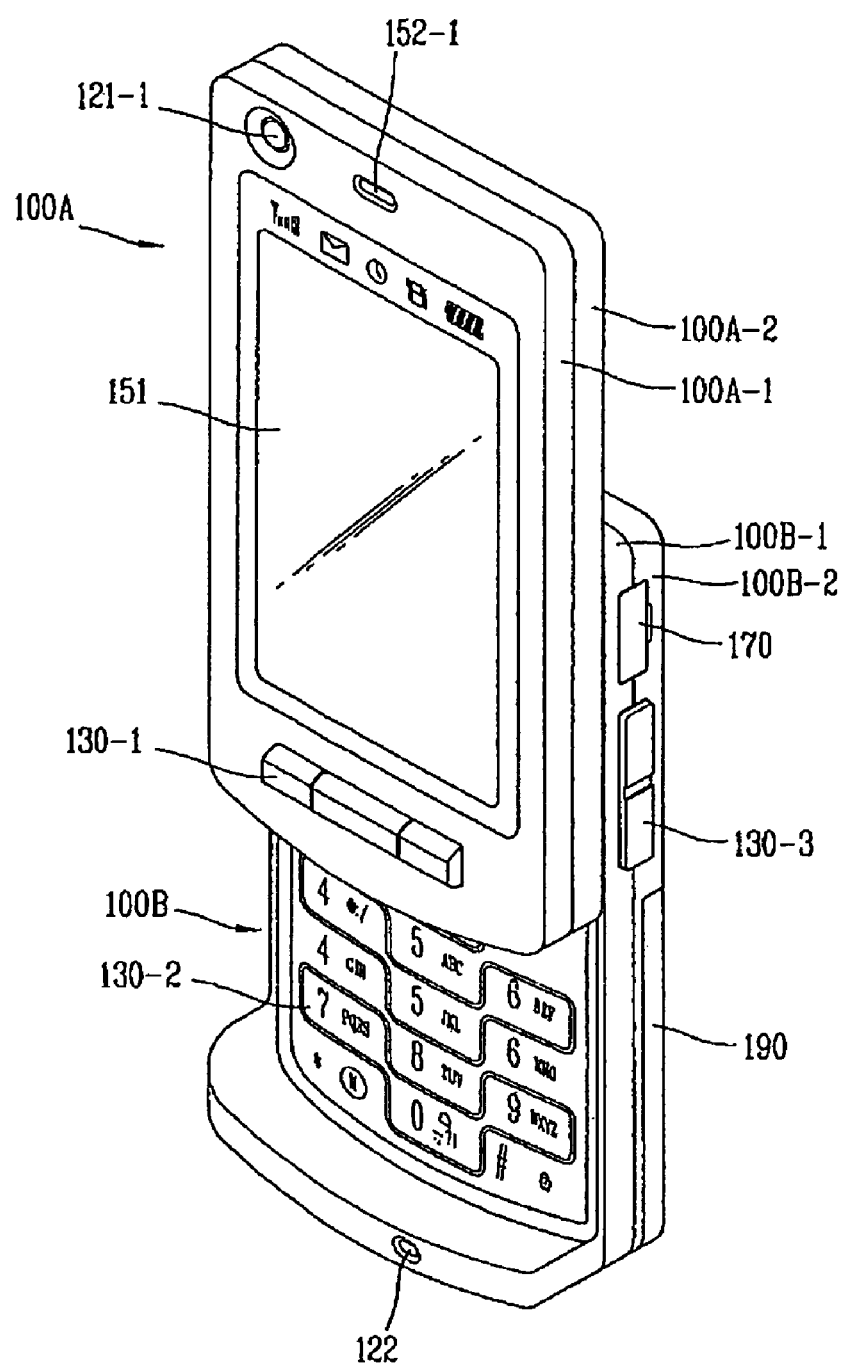
FIG. 2 is a front perspective view showing an exemplary slide-type mobile terminal according to the present invention.

FIG. 2 is a front perspective view showing an exemplary slide-type mobile terminal according to the present invention. As shown in drawing, the slide-type mobile terminal according to the present invention includes a first body 100a, and a second body 100b performing a sliding motion with respect to the first body 100a in at least one direction.

Here, if the first body 100a is overlaid with the second body 100b by a slide-down operation of the first body 100a, it may be called as a "closed configuration." As shown in FIG. 2, if at least a portion of the second body 100b is exposed by a slide-up operation of the first body 100a, it may be called as all "open configuration."

The mobile terminal in the closed configuration is generally operated in the standby mode. However, the standby mode may be released by a user's manipulation. And, the mobile terminal in the open configuration is generally operated in the calling mode. However, the calling mode may be switched into the standby mode by the user's manipulation or by a lapse of a predetermined period of time.

A case (casing, housing, cover, etc.) forming an external appearance of the first body 100a includes a first front case 100a-1 and a first rear case 100a-2. Various electronic components are built in a space formed by the first front case 100a-1 and the first rear case 100a-2. At least one case may additionally be disposed between the first front case 100a-1 and the first rear case 100a-2.

The cases may be formed by a synthetic resin injection molding, or formed of a metallic material (e.g., stainless steel or Ti, or the like).

The display module 151, a first sound output module 152-1, a first camera module 121-1 or a first manipulating portion 130-1 may be disposed in the first front case 100a-1 of the first body 100a. A size of an area in which the first manipulating portion 130-1 is disposed may be increased or reduced according to a terminal's design.

In particular, if the terminal uses the touch screen as the display module, the area of the manipulating portion 130-1 may be greatly reduced or the manipulating portion may not even exist.

The first sound output module 152-1 may be implemented as a receiver or a speaker. The first camera module 121-1 may be configured to capture an image or a moving image of the user, and the like.

Similarly to the first body 100a, a case forming an external appearance of the second body 100b includes a second front case 100b-1 and a second rear case 100b-2. A second manipulating portion 130-2 may be disposed on a front surface of the second front case 100b-1 of the second body 100b.

A third manipulating portion 130-3, the microphone module 122 and the interface portion 170 may be disposed at least one of the second front case 100b-1 or the second rear case 100b-2.

The first through third manipulating units 130-1~3 may collectively be referred to as the manipulating portion 130, and may be implemented in any types as long as it is operated in a tactile manner.

For instance, the manipulating portion may be configured as a dome switch or a touch pad to which a command or information can be inputted by the user's push or touch manipulation, or may be configured as a wheel, a jog type or a joy stick at which keys are rotated.

The first manipulating portion 130-1 has a function of inputting a command, such as start, stop, scroll, and the like. The second manipulating portion 130-2 has a function of inputting a number, a character, a symbol, and the like.

Further, the third manipulating portion 130-3 can be operated as a hot-key for activating a specific function in the mobile terminal.

Hereinafter, a configuration of a terminal for detecting whether or not a slide-type mobile terminal having a touch screen is slid, and a method thereof will be described in detail in reference to FIGS. 3 and 4

Figure 3A:
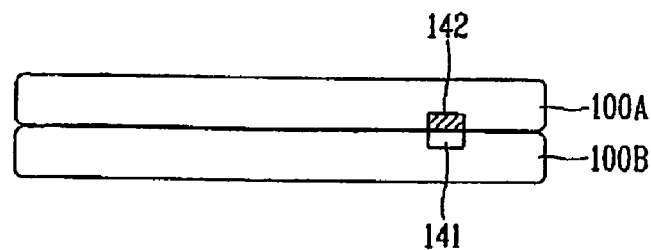
FIG. 3 is a side cross-sectional view showing one embodiment of a method for detecting a sliding motion of a slide-type mobile terminal according to the present invention.
Figure 3B:
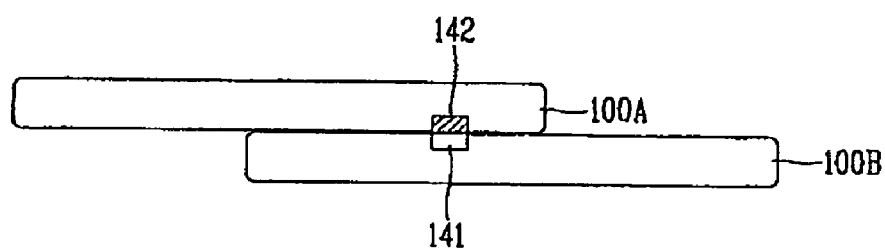
Figure 3C:
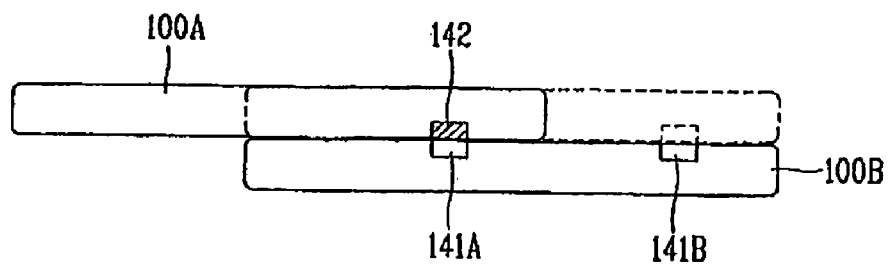

FIG. 3 is a side cross-sectional view showing one embodiment of a method for detecting a sliding motion of a slide-type mobile terminal according to the present invention. As shown in FIG. 3, the sensing portion 140 described in FIG. 1 is provided in an inner space formed by the first body 100a and the second body 100b so as to detect whether the mobile terminal is slid up (open configuration) or slid down (closed configuration).

The sensing portion 140 detects the sliding motion of the mobile terminal, and may include one or more sensors (e.g., hall sensors 141) and magnets 142 at one side of the first body 100a or the second body 100b. Here, the magnet 142 may be formed to have a different length or size according to the shape of the terminal.

The present embodiment is described on the assumption that the magnet 142 is disposed at the first body 100a and a hall sensor 141 is disposed at the second body 100b. Other sensors and arrangements may be used.

In the closed configuration as shown in FIG. 3 (a), the hall sensor 141 may be positioned at the second body 100b in correspondence with the magnet 142 disposed at the first body 100a. Here, if a magnetic force is detected by the hall sensor 141, the controlling portion 180 determines that the terminal is in the closed configuration. On the contrary, if the magnetic force is not detected by the hall sensor 141, the controlling portion 180 may determine that the terminal is in the open configuration.

Further, in the open configuration as shown in FIG. 3 (b), the hall sensor 141 may be positioned at the second body 100b in correspondence with the magnet 142 disposed at the first body 100a. Here, if the magnetic force is detected by the hall sensor 141, the controlling portion 180 determines that the terminal is in the open configuration. However, if the magnetic force is not detected by the hall sensor 141, the controlling portion 180 may determine that the terminal is in the closed configuration.

Meanwhile, in the open configuration and the closed configuration as shown in FIG. 3 (c), the hall sensors 141a and 141b may be respectively positioned at the second body 100b in correspondence with the magnet 142 disposed at the first body 100a. Here, if the hall sensor 143a disposed in correspondence with the magnet 142 in the open configuration detects the magnetic force, the controlling portion 180 determines that the terminal is in the open configuration. And, if the hall sensor 141b disposed in correspondence with the magnet 142 in the closed configuration detects the magnetic force, the controlling portion 180 determines that the terminal is in the closed configuration. Accordingly, if the magnetic force is not detected by the two hall sensors 141a and 141b, the controlling portion 180 may determine that the terminal performs the sliding motion. Thus, when the terminal performs the sliding motion, the terminal can be programmed to be one of the closed configuration or the open configuration.

Figure 4A:
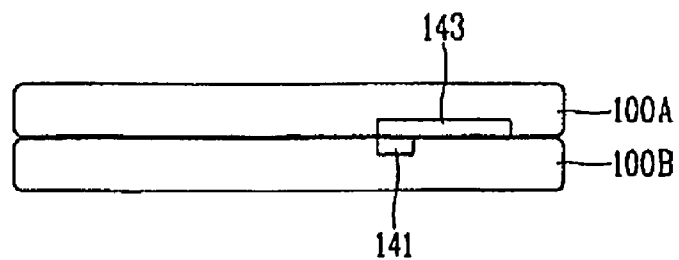
FIG. 4 is a side cross-sectional view showing another embodiment of a method for detecting a sliding motion of a slide-type mobile terminal according to the present invention.
Figure 4B:
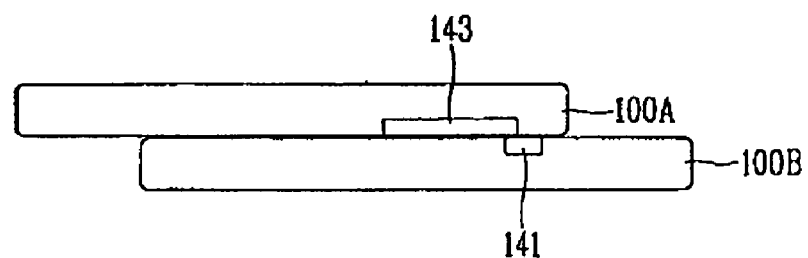
Figure 4C:
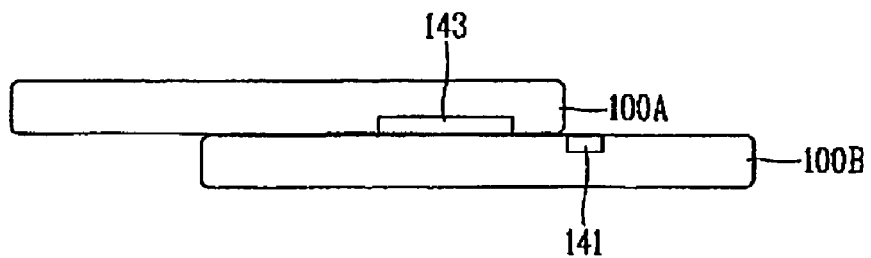

Here, even though the open and closed configurations can be clearly distinguished from each other by using the two hall sensors 141a and 141b shown in FIG. 3 (c), the open and closed configurations can be distinguished from each other by using only one hall sensor according to the configuration shown in FIG. 4.

FIG. 4 is a side cross-sectional view showing another embodiment of a method for detecting the sliding motion of the slide-type mobile terminal according to the present invention. As shown, the magnet 143 is disposed at the first body 100a of the terminal, which is the same as shown in FIG. 3. However, a magnet having a longer length and one hall sensor 141 disposed inside the second body 100b are provided.

If the hall sensor 141 is positioned in correspondence with one end of the magnet 143 in the closed configuration as shown in FIG. 4 (a), or is positioned in correspondence with a portion of the magnet 143 while performing the sliding motion as shown in FIG. 4 (b), the hall sensor 141 may continuously detect the magnetic force of the magnet 143. However, when the terminal is in a fully open configuration as shown in FIG. 4 (c), the magnetic force is finally not detected.

Here, the hall sensor 141 may detect the magnetic force even when the terminal is in the fully closed configuration or in the process of performing the sliding motion. Accordingly, the controlling portion 180 may determine that the terminal is in the closed configuration, even though the terminal is in the fully closed configuration or in the process of performing the sliding motion.

That is, the sensing portion shown in FIG. 4 is configured in a manner that the terminal is driven in an active mode only when the terminal is in the fully open configuration, and that the terminal is driven in a standby mode when the terminal is not in the fully open configuration such as performing the sliding motion, thereby preventing an unintended key input or an execution of a function associated with the key inputted.

Figure 5A:
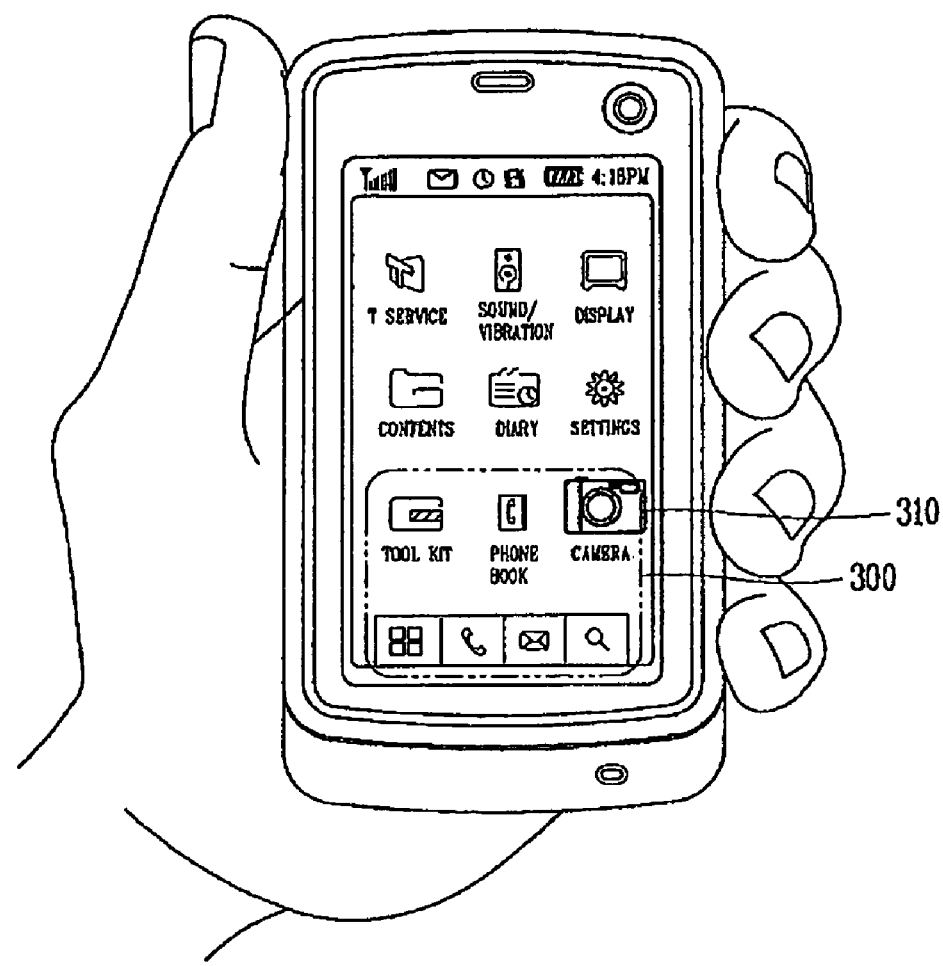
FIGS. 5A through 5C are exemplary views showing a case that a particular icon on a touch screen is touched when a mobile terminal according to the present invention is slid up/down.
Figure 5B:
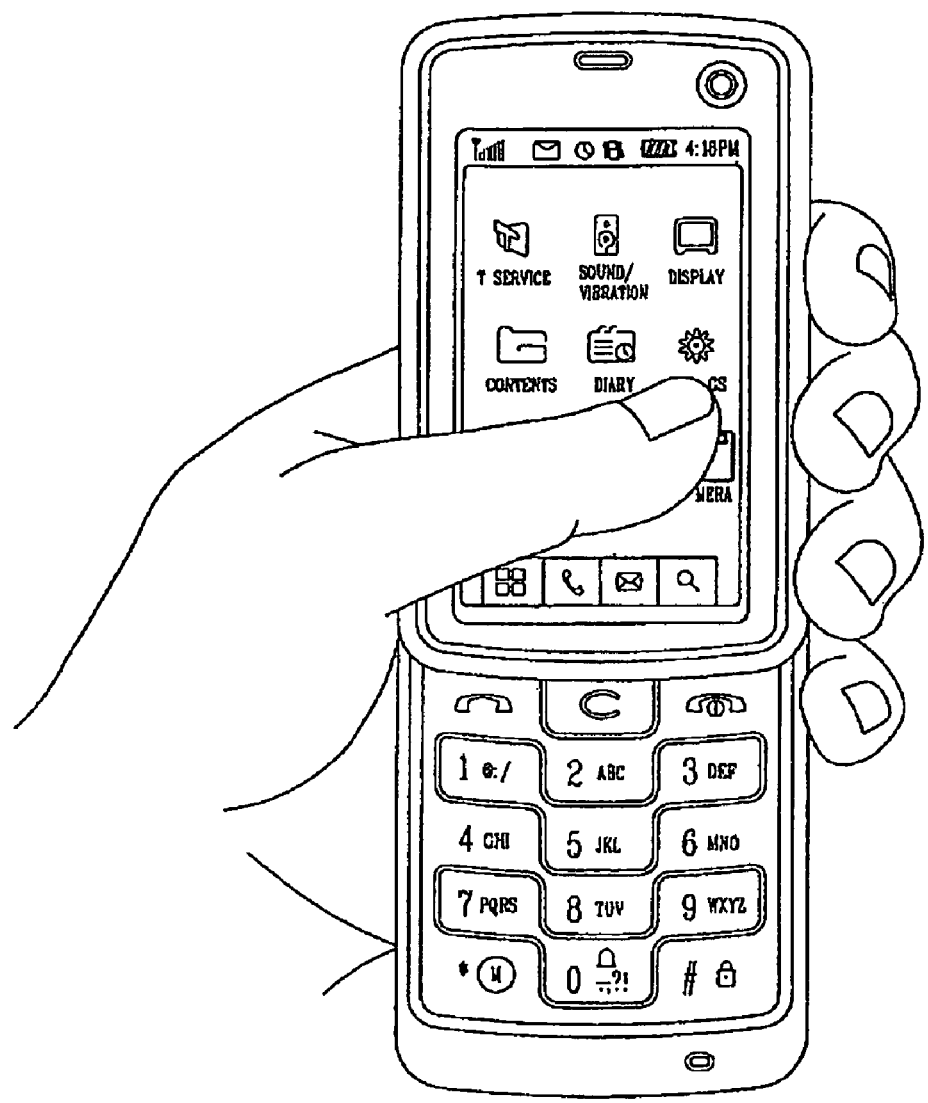
Figure 5C:
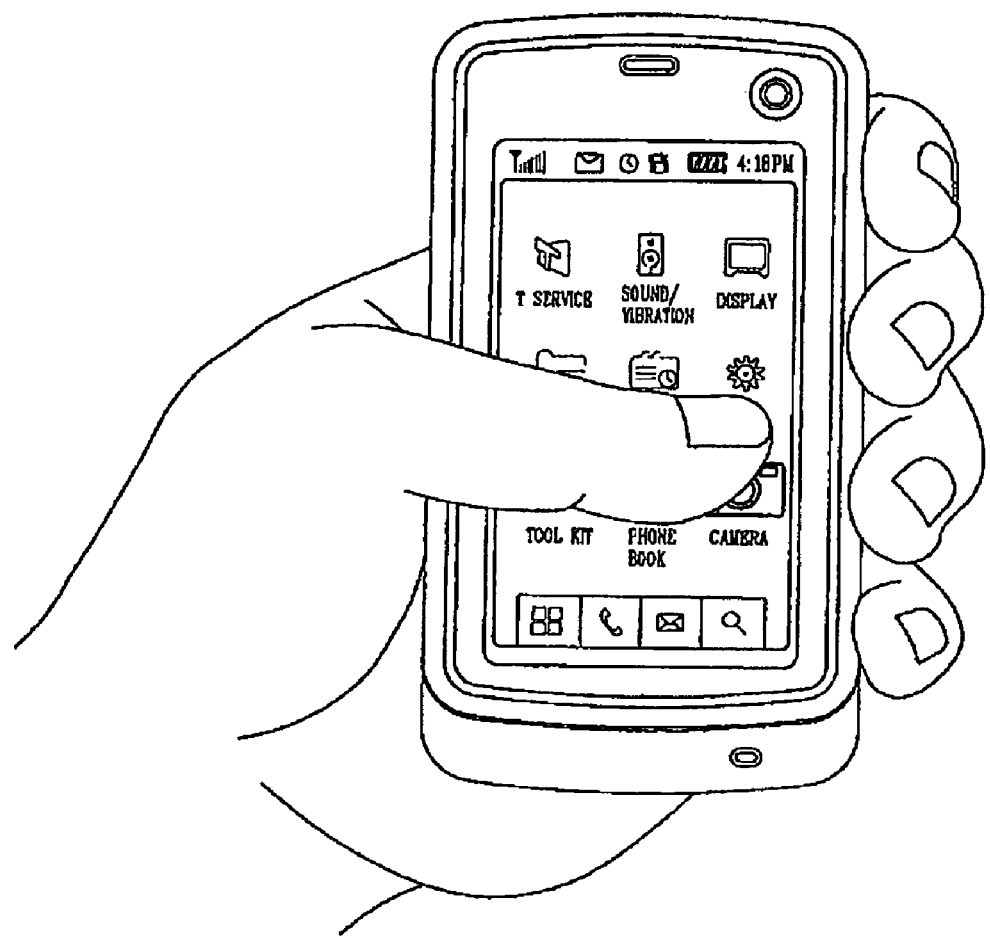

FIGS. 5A through 5C are exemplary views showing a touch recognition method for a slide-type mobile terminal having a touch screen according to the present invention.

Referring to FIGS. 5A through 5C, in a slide-type mobile terminal having a touch screen on a front surface of a first body 100a, a user manipulates the terminal mainly by touching the touch screen in the closed configuration. However, in the open configuration, the user manipulates the terminal mainly by using a second manipulating portion 130-2, even though the user may manipulate the terminal by touching the touch screen.

In addition, a touch recognition function may be deactivated in the closed configuration so as to prevent an input by an unintended touch while being carried.

Hereinafter, a method for executing a function associated with an icon (or a menu) displayed on the touch screen by touching the icon will be explained in detail.

Referring to FIG. 5A, various functional icons (or menus or menu items) are displayed on the touch screen 151 of the mobile terminal. If a user selects and touches an icon 310 among the displayed icons, the selected icon 310 is highlighted so as to allow the user to recognize that the icon has been selected.

Meanwhile, in FIG. 5A, the touch screen 151 does not seem to be touched by the finger so as to explain the highlighted icon 310. However, in substance, an icon is highlighted when the icon is touched by the finger as shown in FIGS. 5B and 5C.

The highlight is to distinguish the selected icon from unselected icons by changing or adding at least one of a shape of an icon, a color, brightness, a shadow, an animated element, a text and vibration.

After the touched icon is highlighted, and upon releasing the touch to the icon, a function associated with the icon is executed.

In addition to such method of executing the function by the release after touch, functions may be executed by at least two consecutive-touches of the icon or by touching the icon long for a certain period of time.

However, in the slide-type terminal configured to execute a function associated with the icon upon releasing after touching the icon as described above or configured to execute a function associated with the icon by the long touch, when the touch screen is touched for the sliding motion as shown in FIG. 5B or 5C, an icon may be unintentionally touched and a function associated with the touched icon may be executed.

FIG. 5B shows an example that a particular icon on the touch screen is touched when the terminal is slid up. And, FIG. 5C shows an example that a particular icon on the touch screen is touched when the terminal is slid down.

That is, the slide-type terminal is slid when the first body of the terminal is pushed up or pulled down by a thumb of a hand of a user holding the terminal. However, if the front surface of the first body of the slide-type terminal is formed as the touch screen or if a manipulating portion with minimum elements is disposed below the touch screen, the terminal cannot be slid up or down without touching the touch screen. That is because there is no boundary portion enough to be pressed by a finger between the display portion and the manipulating unit, and even if there is a boundary portion, it is located at a position difficult to press.

Accordingly, users press the touch screen when sliding the terminal, and then a certain functional icon displayed on the pressed location is touched, thereby automatically executing the function associated with the icon regardless of the user's intention.

Here, the thumb for sliding the terminal can be variously located according to a user. However, users generally press a portion among a middle lower portion 300 of the first body 100a (dotted lines in FIG. 5A) to push up or pull down the first body 100a. Accordingly, icons displayed on the corresponding portion have a high probability to be touched and executed.

Hereinafter, the touch recognition method when the slide-type terminal having the touch screen performs the sliding motion will be explained in detail.

Figure 6:
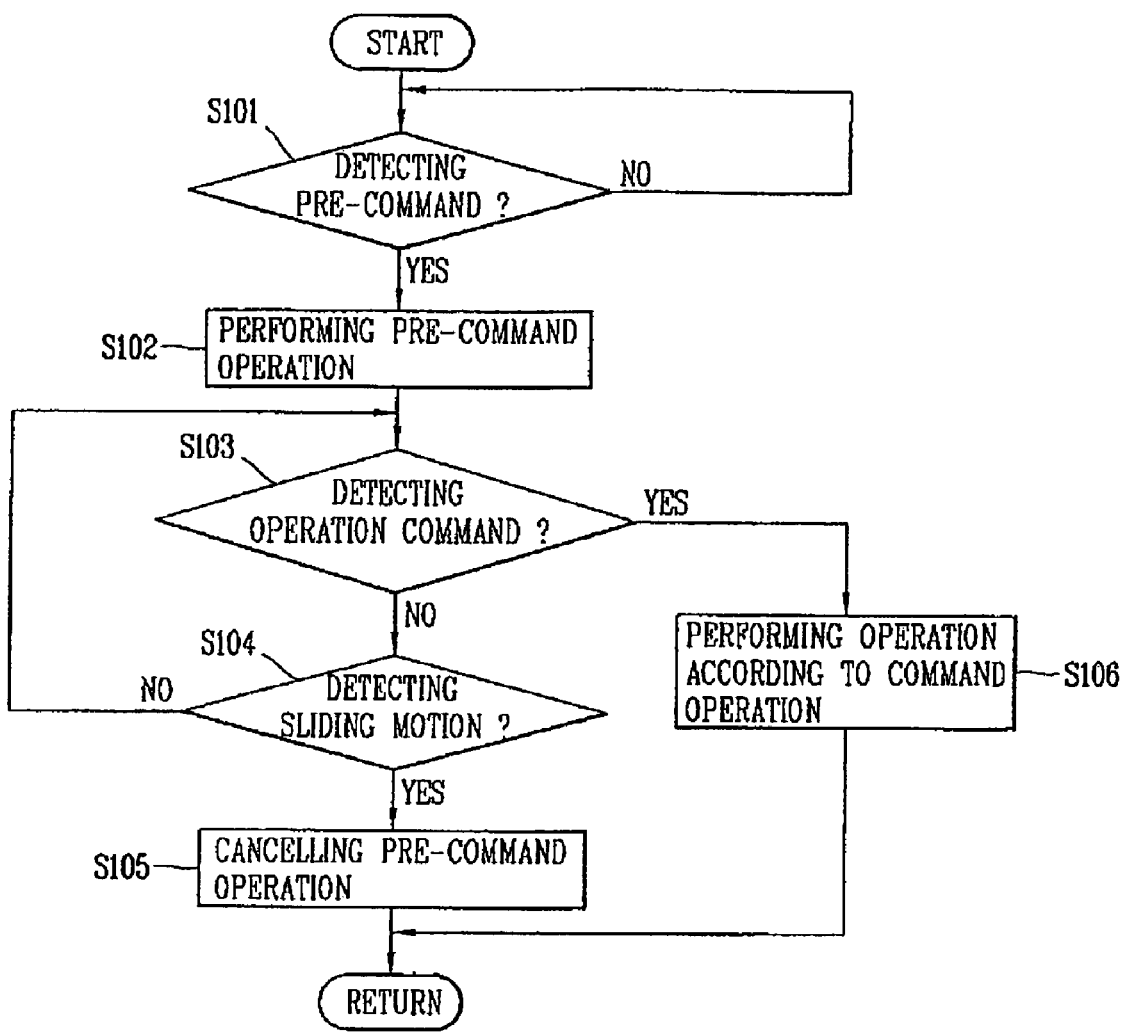
FIG. 6 is a flowchart showing one embodiment of a touch recognition method when a mobile terminal according to the present invention performs a sliding motion.

FIG. 6 is a flowchart showing one embodiment of the touch recognition method when a mobile terminal according to the present invention performs a sliding motion.

Referring to FIG. 6, the controlling portion 180 detects a pre-command which is inputted through the touch screen of the mobile terminal (S101). Here, the term "pre-command" notifies the controlling portion 180 to be ready for an operation before the operation is performed. There may be various types of pre-commands according to a method for executing the touch function.

For instance, the pre-command can be one of a state when a functional icon (or a menu) displayed on the touch screen is being touched for a predetermined period of time, when the functional icon is being touched without setting a predetermined period of time until the touch is released, or before an additional touch is inputted within a predetermined period of time after the first touch.

If the pre-command is detected, the controlling portion 180 performs a pre-command operation in a predetermined method so as to allow a user to recognize that the operation is ready to perform (S102). In the present embodiment, the pre-command operation can be an operation to highlight the touched icon. The highlighting method has been already explained, and explanations therefore will be omitted.

The controlling portion 180 having performed the pre-command operation detects an operation command (S103).

Here, the term "operation command" is a command to instruct the controlling portion 180 to actually perform an operation, for instance, at least two consecutive touches, to a touch release or a long touch over a certain period of time.

If an operation command is detected through the operation command detecting process (S103), the controlling portion 180 performs an operation according to the operation command (S106). That is, if an operation command for a particular functional icon is detected, a function associated with the particular icon is executed.

However, if a sliding up/down motion is detected before an operation command is detected (S104), the controlling portion 180 cancels the pre-command operation (S105). Accordingly, when the terminal is slid, the execution of a function associated with an icon unintentionally touched by the user can be prevented.

Figure 7:
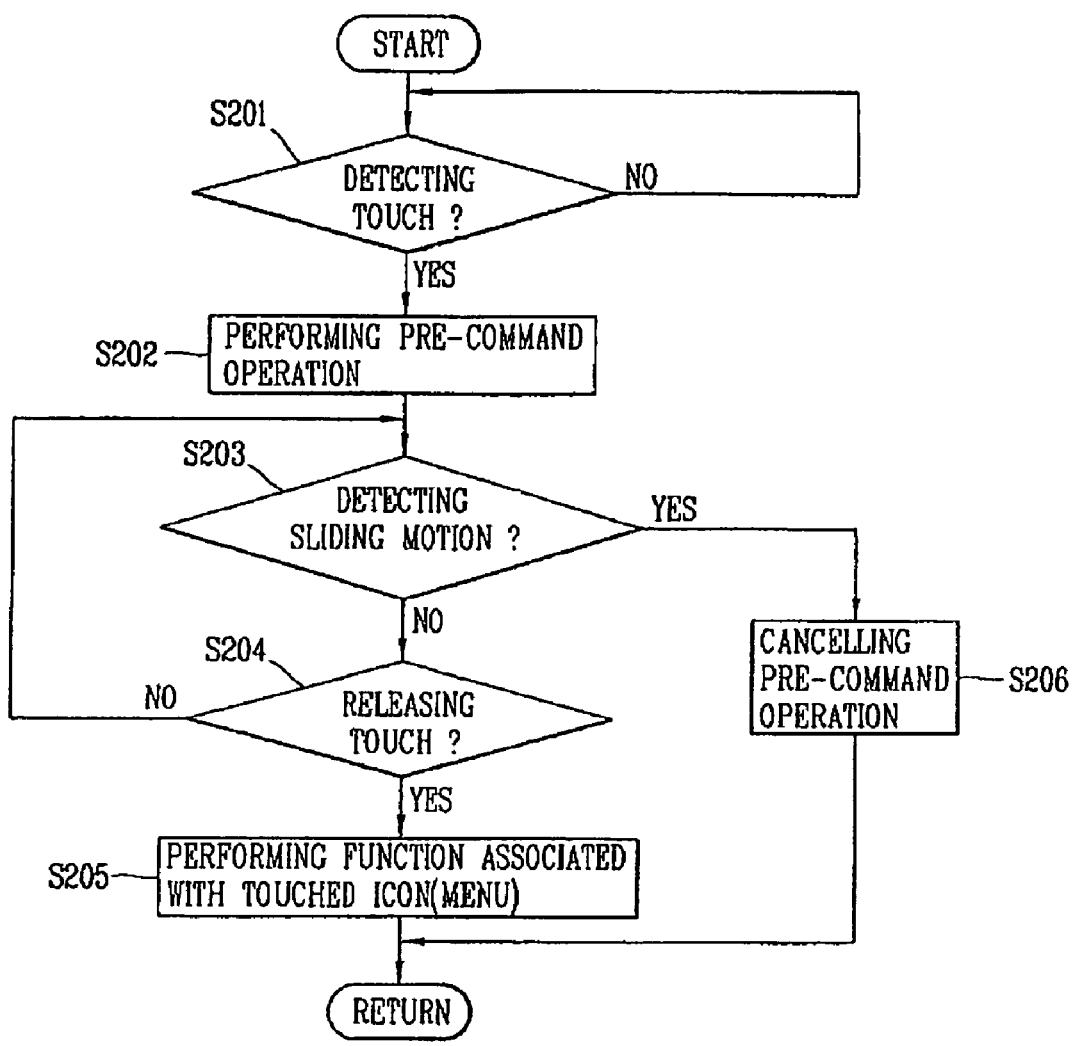
FIG. 7 is a flowchart showing another embodiment of a touch recognition method when a mobile terminal according to the present invention performs a sliding motion.

FIG. 7 is a flowchart showing another embodiment of the touch recognition method when a mobile terminal according to the present invention performs the sliding motion.

Referring to FIG. 7, the controlling portion 180 detects whether or not a touch input on the touch screen of the mobile terminal is present (S210), and if there is a touch input, the controlling portion 180 performs a pre-command operation for the touched icon (or menu) (S202).

If a sliding motion is detected before the inputted touch is released (S203), the pre-command operation is cancelled (S206). But, if the sliding motion is not performed and the touch is released (S204), a function associated with the touched icon (or menu) is executed (S205).

In the present invention, if the sliding motion is detected when a pre-command has been inputted by a touch, the pre-command operation having been performed is immediately cancelled so as to prevent the performance of an operation according to the operation command, thereby preventing the execution of unintended function when the terminal performs the sliding motion.

Figure 8:
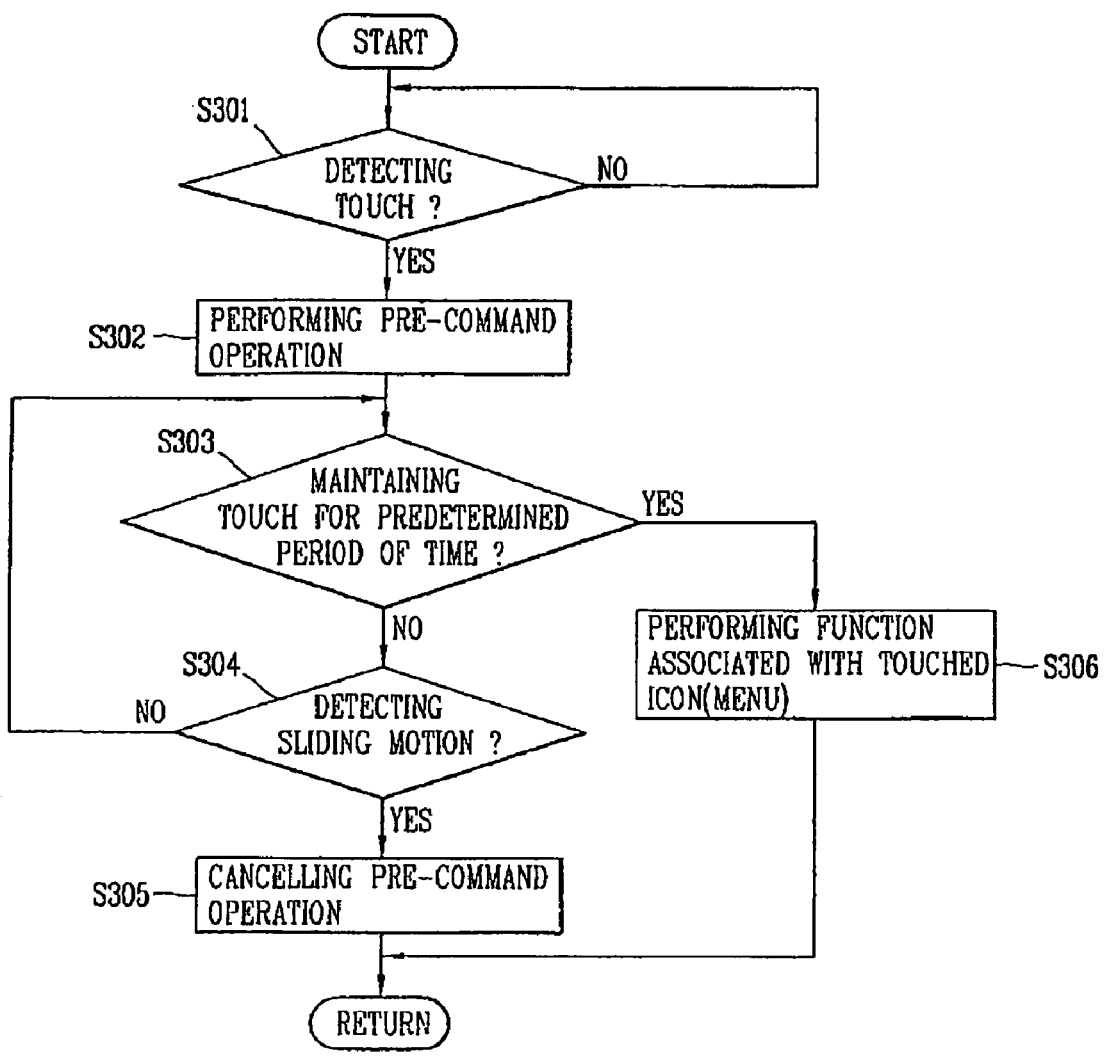
FIG. 8 is a flowchart showing still another embodiment of a touch recognition method when a mobile terminal according to the present invention performs a sliding motion.

FIG. 8 is a flowchart showing still another embodiment of the touch recognition method when a mobile terminal according to the present invention performs the sliding motion.

As shown in FIG. 8, the controlling portion 180 detects whether or not a touch input on the touch screen of the mobile terminal is present (S301), and if there is a touch input, the controlling portion 180 performs a pre-command operation for the touched icon (or menu) (S302).

If the touch is maintained for a predetermined period of time, the controlling portion 180 recognizes it as an operation command and performs the function associated with the touched icon (or menu) (S306). However, if the sliding motion is detected before the predetermined period of time has passed (S304), the controlling portion 180 cancels the pre-command operation (S305).

In this embodiment, if the sliding motion is detected when a pre-command has been inputted by a touch, the pre-command having been performed is immediately cancelled, thereby preventing the performance of an operation according to the operation command. Accordingly, when the terminal performs the sliding motion, the execution of an unintended function can be prevented.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. For a software implementation, the embodiments described herein may be implemented with separate software modules, such as procedures and functions, each of which perform one or more of the functions and operations described herein. The software codes can be implemented with a software application written in any suitable programming language As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of controlling a mobile terminal having a touch screen, the method comprising:
    detecting a first touch on an object displayed on the touch screen while first and second slidable bodies of the mobile terminal are in a closed or opened state, the touch screen being disposed on an outside of the first body so as to face outwards;
    distinctly displaying the touched object from untouched objects upon the detecting the first touch without executing an operation associated with the touched object;
    detecting whether the first body is being slid with respect to the second body while the first touch is maintained on the object;
    executing the operation associated with the object upon release of the first touch if the first body is not being slid with respect to the second body while the first touch is maintained on the object; and
    undoing the distinctly displaying of the touched object without executing the operation associated with the object if the first body is being slid with respect to the second body while the first touch is maintained on the object.

2. The method of claim 1, wherein the first and second bodies are configured to slide up or slide down relative to each other.

3. The method of claim 1, wherein the executing step executes the operation associated with the object based on a single touch or double touch action when the detecting step detects the first body is not being slid with respect to the second body.

4. The method of claim 1, wherein the executing step executes the operation associated with the object when the first touch is released after a predetermined period of time, when the detecting step detects the first body is not being slid with respect to the second body.

5. The method of claim 1, wherein the distinctly displaying step distinctly displays the touched object by changing or adding a shape, a color, brightness, a shadow, an animated element, a text or vibration associated with the touched object.

6. The method of claim 1, wherein the object is an icon or a menu.

7. A mobile terminal, comprising:
    a communication module configured to wirelessly communicate with a base station;
    a first and a second body configured to slide relative to each other;
    a sensor configured to detect an opened configuration or a closed configuration of the first and second bodies;
    a touch screen display disposed in the first body or the second body, the touch screen display being disposed on an outside of the first body so as to face outwards; and
    a controller disposed in the first body or the second body and configured to:
    detect a first touch on an object displayed on the touch screen while first and second slidable bodies of the mobile terminal are in a closed or opened state, the touch screen being disposed on an outside of the first body so as to face outwards,
    distinctly display the touched object from untouched objects upon the detecting the first touch without executing an operation associated with the touched object,
    detect whether the first body is being slid with respect to the second body while the first touch is maintained on the object,
    execute the operation associated with the object upon release of the first touch if the first body is not being slid with respect to the second body while the first touch is maintained on the object, and
    undo the distinct display of the touched object without executing the operation associated with the object if the first body is being slid with respect to the second body while the first touch is maintained on the object.

8. The mobile terminal of claim 7, wherein the sensor comprises:
    one or more hall sensors in the first body; and
    a magnet in the second body, wherein the magnet is of a different length or size than each one of the one or more hall sensors.

9. The mobile terminal of claim 8, wherein the one or more hall sensors are positioned to be under an influence of a magnetic force of the magnet when the first body and the second body are transitioning between the opened configuration and the closed configuration.

10. The mobile terminal of claim 8, wherein the one or more hall sensors are positioned to be out of an influence of a magnetic force of the magnet when the first body and the second body are in the opened configuration.

11. The mobile terminal of claim 8, wherein the one or more hall sensors are positioned to be under influence of a magnetic force of the magnet when the first body and the second bodies are in the closed configuration.

12. The mobile terminal of claim 7, wherein the first and second bodies are configured to slide up or slide down relative to each other.

13. The mobile terminal of claim 7, wherein the controller is further configured to execute the operation associated with the object based on a single touch or double touch action when the sensor detects the first body is not being slid with respect to the second body.

14. The mobile terminal of claim 7, wherein the controller is further configured to execute the operation associated with the object when the first touch is released after a predetermined period of time, when the sensor detects the first body is not being slid with respect to the second body.

15. The mobile terminal of claim 7, wherein the controller is further configured to distinctly display the touched object by changing or adding a shape, a color, brightness, a shadow, an animated element, a text or vibration associated with the touched object.

16. The mobile terminal of claim 7, wherein the object is an icon or a menu.

* * * * *